United States Patent
Kim et al.

(10) Patent No.: US 11,172,160 B2
(45) Date of Patent: Nov. 9, 2021

(54) METHOD OF OPERATING A DISPLAY DEVICE SUPPORTING A VARIABLE FRAME MODE, AND THE DISPLAY DEVICE

(71) Applicant: Samsung Display Co., Ltd., Yongin-si (KR)

(72) Inventors: Hong-Kyu Kim, Suwon-si (KR); Yong-Bum Kim, Suwon-si (KR); Po-Yun Park, Seoul (KR); Dong-Hyun Yeo, Yongin-si (KR); Byungkil Jeon, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/124,094

(22) Filed: Sep. 6, 2018

(65) Prior Publication Data

US 2019/0253662 A1    Aug. 15, 2019

(30) Foreign Application Priority Data

Feb. 12, 2018   (KR) .......................... 10-2018-0017155

(51) Int. Cl.
*H04N 7/01* (2006.01)

(52) U.S. Cl.
CPC ..... *H04N 7/0127* (2013.01); *G09G 2320/029* (2013.01); *G09G 2340/0435* (2013.01)

(58) Field of Classification Search
CPC ........... H04N 7/0127; G09G 2320/029; G09G 2340/0435
See application file for complete search history.

(56) References Cited

U.S. PATENT DOCUMENTS

| 8,854,402 | B2 | 10/2014 | Li et al. |
| 10,043,459 | B1* | 8/2018 | de Greef ................ G09G 3/348 |
| 2006/0038759 | A1* | 2/2006 | Hong .................... G09G 3/3648 |
| | | | 345/87 |
| 2012/0099017 | A1* | 4/2012 | Wester ..................... H04N 7/01 |
| | | | 348/441 |
| 2014/0092150 | A1* | 4/2014 | Slavenburg ............ G09G 5/001 |
| | | | 345/698 |

(Continued)

FOREIGN PATENT DOCUMENTS

| KR | 10-2006-0017239 A | 2/2006 |
| KR | 10-2017-0028479 A | 3/2017 |
| KR | 10-2017-0085648 A | 7/2017 |

*Primary Examiner* — Maurice L. McDowell, Jr.
*Assistant Examiner* — Donna J. Ricks
(74) *Attorney, Agent, or Firm* — Lewis Roca Rothgerber Christie LLP

(57) ABSTRACT

In a method of operating a display device supporting a variable frame mode, frame data are received during a constant active period of a frame period including the active period and a variable blank period, the received frame data are written to a frame memory in the active period, the received frame data are outputted to a data driver in the active period to display an image based on the received frame data, a time of the variable blank period is counted, and, when the time of the variable blank period reaches a predetermined threshold blank time, the frame data stored in the frame memory are outputted to the data driver in the variable blank period to display an image based on the frame data stored in the frame memory.

16 Claims, 12 Drawing Sheets

(56) References Cited

U.S. PATENT DOCUMENTS

| | | | | |
|---|---|---|---|---|
| 2015/0348509 A1* | 12/2015 | Verbeure | ............... | G06T 1/20 |
| | | | | 345/213 |
| 2016/0275916 A1* | 9/2016 | Glen | ............... | G09G 5/395 |
| 2017/0069256 A1* | 3/2017 | Seo | ............... | G09G 3/2096 |
| 2017/0206850 A1* | 7/2017 | Kim | ............... | G09G 3/3696 |
| 2018/0174551 A1* | 6/2018 | Ansari | ............... | G09G 5/12 |

* cited by examiner

METHOD OF OPERATING A DISPLAY DEVICE SUPPORTING A VARIABLE FRAME MODE, AND THE DISPLAY DEVICE

CROSS-REFERENCE TO RELATED APPLICATION

This application claims priority to and the benefit of Korean Patent Application No. 10-2018-0017155, filed on Feb. 12, 2018 in the Korean Intellectual Property Office (KIPO), the content of which is incorporated herein in its entirety by reference.

BACKGROUND

1. Field

Exemplary embodiments of the present inventive concept relate to display devices, and more particularly to display devices supporting variable frame modes, and methods of operating the display devices.

2. Description of the Related Art

A display device may generally display (or refresh) an image with (or at) a constant frame rate of about 60 Hz or more. However, a frame rate of rendering by a host processor (e.g., a graphic processing unit (GPU) or a graphic card) providing frame data to the display device may be different from the refresh frame rate of the display device. In particular, when the host processor provides the display device with frame data for a game image (gaming image) that requires complicated rendering, the frame rate mismatch may be intensified, and a tearing phenomenon where a boundary line is caused by the frame rate mismatch in an image of the display device may occur.

To prevent the tearing phenomenon, a variable frame mode (e.g., Free-Sync, G-Sync, etc.) in which a host processor provides frame data to a display device with a variable frame rate by changing a length of a blank period in each frame has been developed. A display device supporting the variable frame mode may display (or refresh) an image in synchronization with the variable frame rate, thereby reducing or preventing the tearing phenomenon.

However, in the display device operating in the variable frame mode, the length (or a duration of time) of the blank period may be increased compared with a length of a blank period in a normal mode in which an image is displayed with a constant frame rate, and the increased blank period may cause a leakage current, etc., which results in deterioration of luminance and deterioration of an image quality.

SUMMARY

Aspects of some example embodiments are directed toward a method of operating a display device supporting a variable frame mode capable of improving an image quality.

Aspects of some example embodiments are directed toward a display device supporting a variable frame mode capable of improving an image quality.

According to an example embodiment, there is provided a method of operating a display device supporting a variable frame mode. In the method, frame data are received during a constant active period of a frame period, the frame period including the active period and a variable blank period. Here, the received frame data are written to a frame memory in the active period, the received frame data are outputted to a data driver in the active period to display an image based on the received frame data, a time of the variable blank period is counted, and, when the time of the variable blank period reaches a set or predetermined threshold blank time, the frame data stored in the frame memory are outputted to the data driver in the variable blank period to display an image based on the frame data stored in the frame memory.

In an example embodiment, the frame memory may have a size corresponding to the frame data of one frame.

In an example embodiment, the frame data written to the frame memory in a current frame may be used in a dynamic capacitance compensation (DCC) operation for frame data to be received in a next frame.

In an example embodiment, the time of the variable blank period may be counted using an internal oscillator included in a timing controller of the display device.

In an example embodiment, the threshold blank time may be settable by a host processor.

In an example embodiment, the frame data stored in the frame memory may be outputted with a constant frame rate from when the time of the variable blank period reaches the threshold blank time to when new frame data are received.

In an example embodiment, in the variable frame mode, the frame data may be inputted from a host processor to the display device with a frame rate that is changed within a predetermined frame rate range, and the constant frame rate at which the frame data stored in the frame memory are outputted may be a maximum frame rate within the frame rate range.

In an example embodiment, previous frame data written to the frame memory in a previous frame may be read from the frame memory in the active period of a current frame, and a correction (or correction process) for the frame data received in the current frame may be performed based on the previous frame data.

In an example embodiment, the correction may be a dynamic capacitance compensation (DCC) (or DCC operation) for the frame data of the current frame based on differences between the frame data of the current frame and the previous frame data.

In an example embodiment, when new frame data are received while the frame data stored in the frame memory are outputted, outputting the frame data stored in the frame memory may be stopped, the new frame data may be written to the frame memory, and the new frame data may be outputted to the data driver to display an image based on the new frame data.

In an example embodiment, when new frame data are received while the frame data stored in the frame memory are outputted, outputting the frame data stored in the frame memory may continue, and the new frame data may be written to the frame memory.

In an example embodiment, an output period in which the received frame data or the frame data stored in the frame memory are outputted may be shorter than the active period in which the frame data are received.

In an example embodiment, the output period may be shorter than or equal to a half of the active period.

In an example embodiment, the frame memory may have a size corresponding to the frame data of two frames.

In an example embodiment, a time from when outputting the frame data stored in the frame memory is completed may be counted, and, when the counted time from when outputting the frame data stored in the frame memory is completed reaches a set or predetermined threshold insertion time, the frame data stored in the frame memory may be outputted again to the data driver.

In an example embodiment, the threshold insertion time may be settable by a host processor.

According to example embodiments, there is provided a display device including a display panel including a plurality of pixels, a gate driver configured to provide gate signals to the plurality of pixels, a data driver configured to provide data signals to the plurality of pixels, a frame memory, and a timing controller configured to support a variable frame mode, and to control the gate driver, the data driver and the frame memory. The timing controller receives frame data during a constant active period of a frame period including the active period and a variable blank period. In the active period, the timing controller writes the received frame data to the frame memory, and outputs the received frame data to the data driver to display an image based on the received frame data. When a time of the variable blank period reaches a predetermined threshold blank time, the timing controller outputs the frame data stored in the frame memory to the data driver in the variable blank period to display an image based on the frame data stored in the frame memory.

In an example embodiment, the timing controller may include a blank time counter configured to count the time of the variable blank period.

In an example embodiment, the timing controller may further include a data processing unit configured to read previous frame data written to the frame memory in a previous frame from the frame memory in the active period of a current frame, and to perform a correction for the frame data received in the current frame based on the previous frame data.

In an example embodiment, the correction may be a dynamic capacitance compensation (DCC) for the frame data of the current frame based on differences between the frame data of the current frame and the previous frame data.

As described above, the method of operating the display device supporting the variable frame mode and the display device according to example embodiments may count a time of a variable blank period, and may display an image based on frame data stored in a frame memory when the time of the variable blank period reaches a predetermined threshold blank time, thereby reducing or preventing image quality deterioration caused by a leakage current in the variable blank period.

In addition, the method of operating the display device supporting the variable frame mode and the display device according to example embodiments may perform frame insertion before the variable blank period of an input frame ends, and thus the frame insertion may be performed without a frame delay between the input frame and an output frame.

Further, the method of operating the display device supporting the variable frame mode and the display device according to example embodiments may display the image in the variable blank period based on the frame data stored in the frame memory for a set or predetermined correction or correction process (e.g., a dynamic capacitance compensation (DCC)), and thus the frame insertion in the variable blank period may be performed without an additional frame memory other than the frame memory for the DCC.

BRIEF DESCRIPTION OF THE DRAWINGS

Illustrative, non-limiting example embodiments will be more clearly understood from the following detailed description in conjunction with the accompanying drawings.

DETAILED DESCRIPTION

Hereinafter, embodiments of the present inventive concept will be explained in detail with reference to the accompanying drawings.

Figure 1:
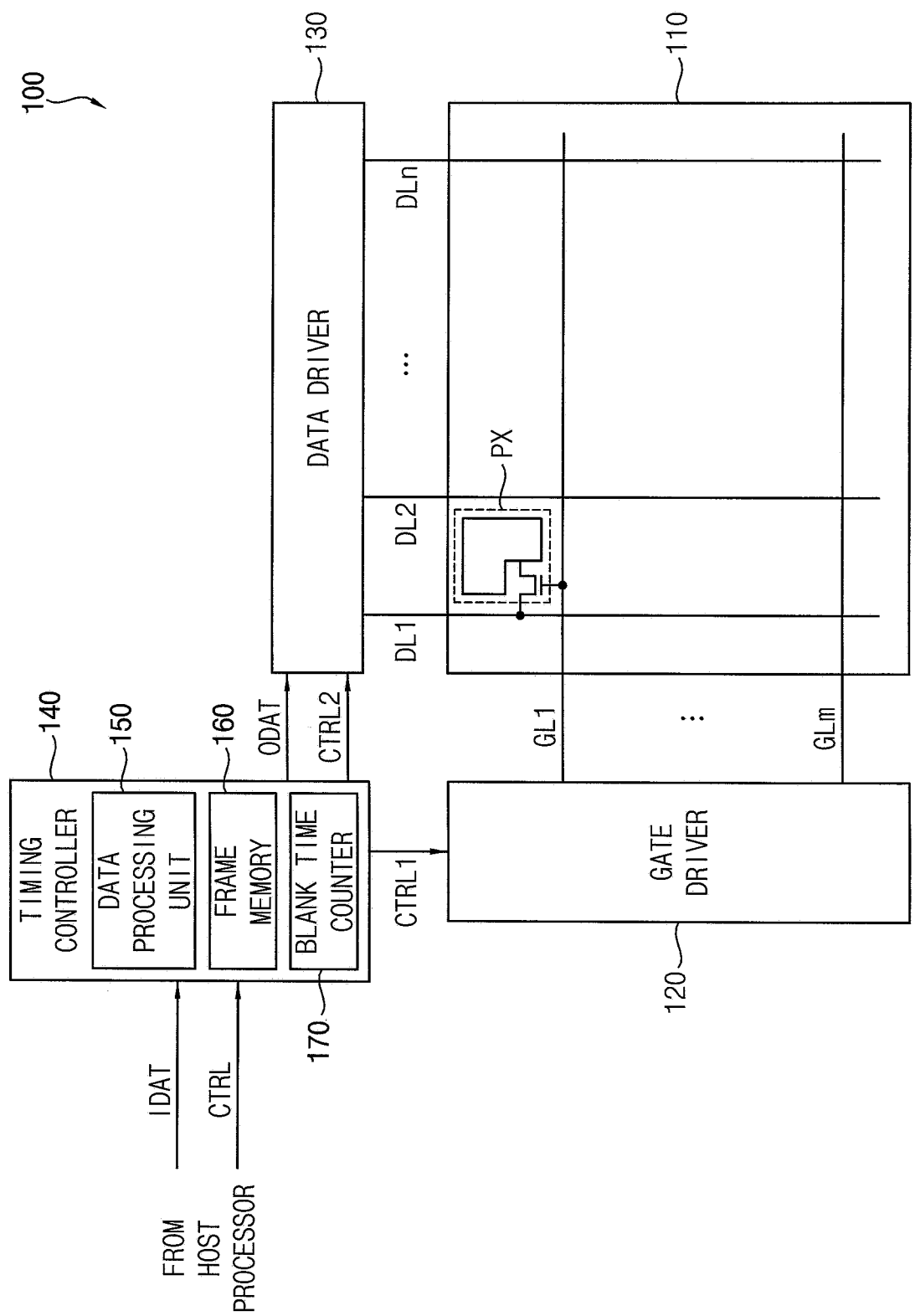
FIG. 1 is a block diagram illustrating a display device according to example embodiments.
Figure 2:
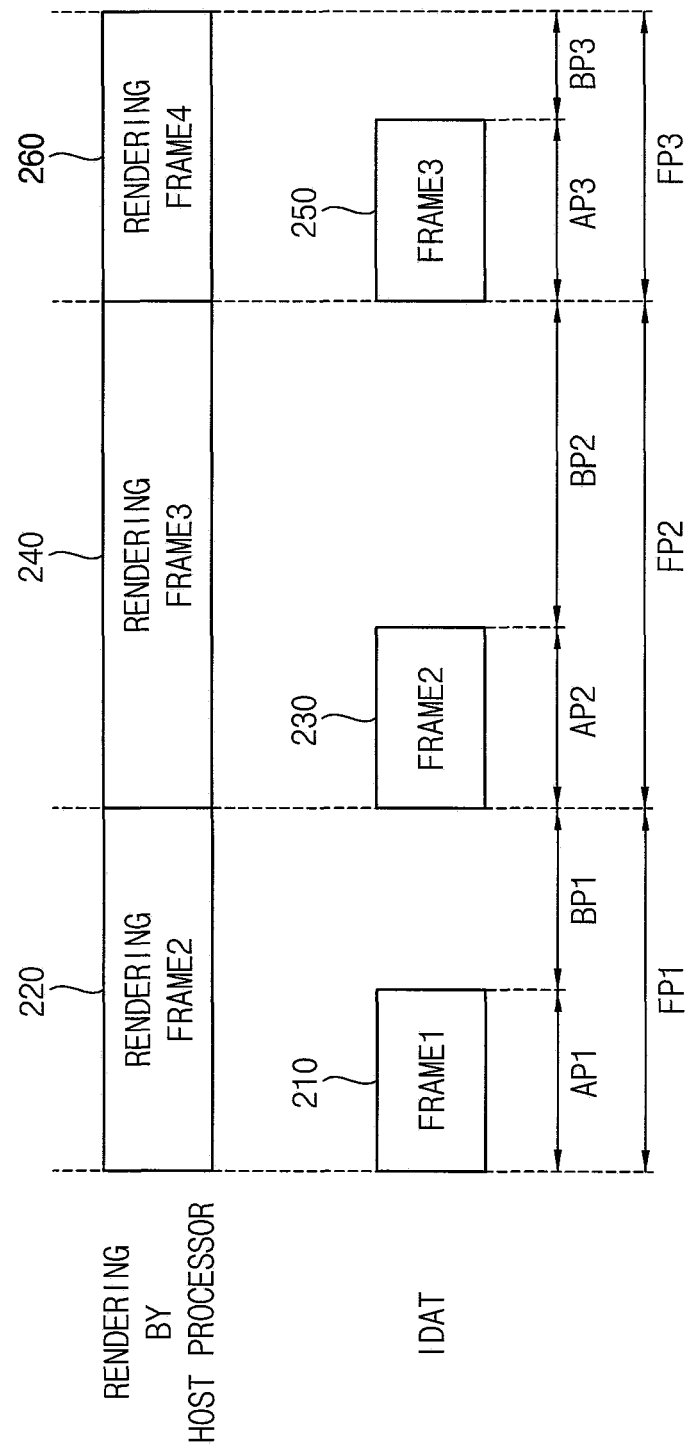
FIG. 2 is a diagram illustrating an example of frame data inputted to a display device in a variable frame mode.

FIG. 1 is a block diagram illustrating a display device according to example embodiments, and FIG. 2 is a diagram illustrating an example of frame data inputted to a display device in a variable frame mode.

Referring to FIG. 1, a display device 100 includes a display panel 110 (which includes a plurality of pixels PX), a gate driver 120 (which provides gate signals to the plurality of pixels PX), a data driver 130 (which provides data signals to the plurality of pixels PX), a frame memory 160, and a timing controller 140 (which controls the gate driver 120, the data driver 130 and the frame memory 160).

The display panel 110 may include a plurality of gate lines GL1 and GLm, a plurality of data lines DL1, DL2 and DLn, and the plurality of pixels PX coupled to the plurality of gate lines GL1 and GLm and the plurality of data lines DL1, DL2 and DLn. In some example embodiments, as illustrated in FIG. 1, each pixel PX may include a switching transistor and a liquid crystal capacitor coupled to the switching transistor, and the display panel 110 may be a liquid crystal display (LCD) panel. In other example embodiments, each pixel PX may include at least two transistors, at least one capacitor and an organic light emitting diode (OLED), and the display panel 110 may be an OLED display panel. However, the display panel 110 may not be limited to the LCD panel and the OLED display panel, and may be any suitable display panel.

The gate driver 120 may generate the gate signals based on a gate control signal CTRL1 from the timing controller 140, and may sequentially apply the gate signals to the plurality of gate lines GL1 and GLm. In some example embodiments, the gate control signal CTRL1 may include, but not be limited to, a gate clock signal and a scan start pulse. According to example embodiments, the gate driver 120 may be mounted directly on the display panel 110, coupled to the display panel 110 in a form of a tape carrier package (TCP), or may be integrated in a peripheral portion of the display panel 110.

The data driver 130 may generate the data signals based on frame data ODAT and a data control signal CTRL2 output from the timing controller 140, and may apply the data signals to the plurality of data lines DL1, DL2 and DLn. In some example embodiments, the data control signal CTRL2 may include, but not be limited to, a horizontal start signal and a load signal. According to example embodiments, the data driver 130 may be mounted directly on the display panel 110, coupled to the display panel 110 in a form of a TCP, or may be integrated in the peripheral portion of the display panel 110.

The timing controller 140 may receive frame data IDAT and a control signal CTRL from an external host processor (e.g., a graphic processing unit (GPU) or a graphic card). In some example embodiments, the frame data IDAT may be RGB data including red image data, green image data and blue image data. In some example embodiments, the control signal CTRL may include, but not be limited to, a data enable signal and a pixel clock signal. The timing controller 140 may generate the gate control signal CTRL1, the data control signal CTRL2 and the output frame data ODAT based on the control signal CTRL and the input image data IDAT. The timing controller 140 may control an operation of the gate driver 120 by providing the gate control signal CTRL1 to the gate driver 120, and may control an operation of the data driver 130 by providing the data control signal CTRL2 and the output frame data ODAT to the data driver 130.

The timing controller 140 may support a variable frame mode in which the host processor provides the frame data IDAT to the display device 100 with a variable frame rate by changing a length (or a time) of a blank period in each frame and the timing controller 140 provides the frame data ODAT to the data driver 130 in synchronization with the variable frame rate such that an image is displayed (or refreshed) with the variable frame rate. For example, the variable frame mode may include a Free-Sync mode, a G-Sync mode, etc.

For example, as illustrated in FIG. 2, a period of each of renderings 220, 240, 260 by the host processor (e.g., the GPU or the graphic card) may not be constant (in particular, in a case where game image data are rendered), and the host processor may provide frame data 210, 230, 250 to the display device 100 in synchronization with, respectively, these irregular periods of renderings 220, 240, 260 in the variable frame mode. In particular, in the variable frame mode, the host processor may provide the frame data 210, 230, 250 to the display device 100 with a variable frame rate by changing a length (or a duration of time) of a blank period BP1, BP2, BP3 in each frame period FP1, FP2, FP3 (i.e., of each of blank periods BP1, BP2, and BP2 in, respectively, each of frame periods FP1, FP2, and FP3). In an example of FIG. 2, the host processor may output first frame data 210 during a first active period AP1 of a first frame period FP1, a first blank period BP1 of the first frame period FP1 may continue until rendering 220 for second frame data 230 is completed, the host processor may output the second frame data 230 during a second active period AP2 of a second frame period FP2, a second blank period BP2 of the second frame period FP2 may continue until rendering 240 for third frame data 250 is completed, the host processor may output the third frame data 250 during a third active period AP3 of a third frame period FP3, and a third blank period BP3 of the third frame period FP3 may continue until rendering 260 for fourth frame data is completed. Accordingly, in the variable frame mode, each of the frame periods FP1, FP2, and FP3 may include the constant active period AP1, AP2, AP3 and the variable blank period BP1, BP2, BPa a3.

The timing controller 140 supporting the variable frame mode may receive the frame data IDAT during the active period of the frame period including the constant active period and the variable blank period. In the active period, the timing controller 140 may output the received frame data IDAT to the data driver 130 to display an image based on the received frame data IDAT. Thus, the timing controller 140 may receive the frame data IDAT with the variable frame rate, and may output the frame data ODAT to the data driver 130 with the variable frame rate. Accordingly, the display device 100 supporting the variable frame mode may display (or refresh) an image in synchronization with the variable frame rate, thereby reducing or preventing a tearing phenomenon caused by a frame rate mismatch.

Further, during the active period in which the frame data IDAT are received, the timing controller 140 may write the received frame data IDAT to the frame memory 160. In some example embodiments, the frame data IDAT written to the frame memory 160 may be used for (but is not limited to being used for) a correction (e.g., a dynamic capacitance compensation (DCC)) for frame data received in the next frame. In some example embodiments, the frame memory 160 may have a size corresponding to the frame data IDAT of one frame. In other example embodiments, an output speed of the frame data ODAT may be faster than an input speed of the frame data IDAT, and, in this case, the frame memory 160 may have a size corresponding to the frame data IDAT of two frames. In some example embodiments, as illustrated in FIG. 1, the frame memory 160 may be included in the timing controller 140. In other example embodiments, the frame memory 160 may be located outside the timing controller 140.

In the variable frame mode, since a length (or a duration of time) of the variable blank period may be changed in each frame, the length (or the duration of time) of the variable blank period may be increased compared with a length of a blank period in a normal mode where an image is displayed with a constant frame rate, and the increased blank period may cause a leakage current, etc., which results in deterioration of luminance and deterioration of an image quality.

To reduce or prevent the image quality deterioration caused by the leakage current in the variable blank period, the timing controller 140 according to example embodiments may output the frame data ODAT stored in the frame memory 160 to the data driver 130 to display an image based on the frame data ODAT stored in the frame memory 160 when the time of the variable blank period reaches a set or predetermined threshold blank time. Here, outputting and displaying the frame data ODAT stored in the frame memory 160 may be referred to as frame insertion. To perform this frame insertion, the timing controller 140 may include a blank time counter 170 which counts the time of the variable blank period. For example, the blank time counter 170 may count clocks (or blank data enable pulses (or blank data enable signals) generated using the clocks) of an internal oscillator during the variable blank period by using the internal oscillator included in the timing controller 140, and may compare the number of the counted clocks with the number of clocks corresponding to the threshold blank period. However, the operation of the blank time counter 170 may not be limited to the operation described above. Accordingly, even if the time of the variable blank period is excessively increased, the frame data ODAT stored in the frame memory 160 may be outputted when the time of the variable blank period reaches the threshold blank time, the image may be displayed (or refreshed) based on the outputted frame data ODAT, and thus the image quality deterioration caused by the leakage current in the variable blank period may be reduced or prevented. In some example embodiments, the threshold blank time may be set when the display device 100 is manufactured. In other example embodiments, the threshold blank time may be settable by the host processor while the display device 100 operates.

In some example embodiments, the timing controller 140 may further include a data processing unit 150 which performs a correction for the received frame data IDAT. The data processing unit 150 may read previous frame data written to the frame memory 160 in a previous frame from the frame memory 160 in the active period of a current frame, and may perform the correction for the frame data IDAT received in the current frame based on the previous frame data. In some example embodiments, the data processing unit 150 may perform, as the correction, a dynamic capacitance compensation (DCC) for the frame data IDAT of the current frame based on differences between the frame data IDAT of the current frame and the previous frame data. In some example embodiments, in the active period, reading the previous frame data from the frame memory 160 and writing the received frame data IDAT to the frame memory 160 may be performed for substantially the same time length. In this case, a start time point of reading the previous frame data may precede a start time point of writing the received frame data IDAT, and thus data corruption between the reading and the writing may not occur even if the frame memory 160 has the size corresponding to the frame data IDAT of one frame.

As described above, the display device 100 according to example embodiments may count the time of the variable blank period, and may display the image based on the frame data ODAT stored in the frame memory 160 when the time of the variable blank period reaches the threshold blank time, thereby reducing or preventing the image quality deterioration caused by the leakage current in the variable blank period. Further, in the display device 100 according to example embodiments, since the frame insertion is performed before the variable blank period ends, the frame insertion may be performed without a frame delay between an input frame and an output frame. Further, the display device 100 according to example embodiments may display the image in the variable blank period based on the frame data stored in the frame memory 160 for the correction (e.g., the DCC), and thus the frame insertion in the variable blank period may be performed without an additional frame memory other than the frame memory 160 for the DCC.

Figure 3:
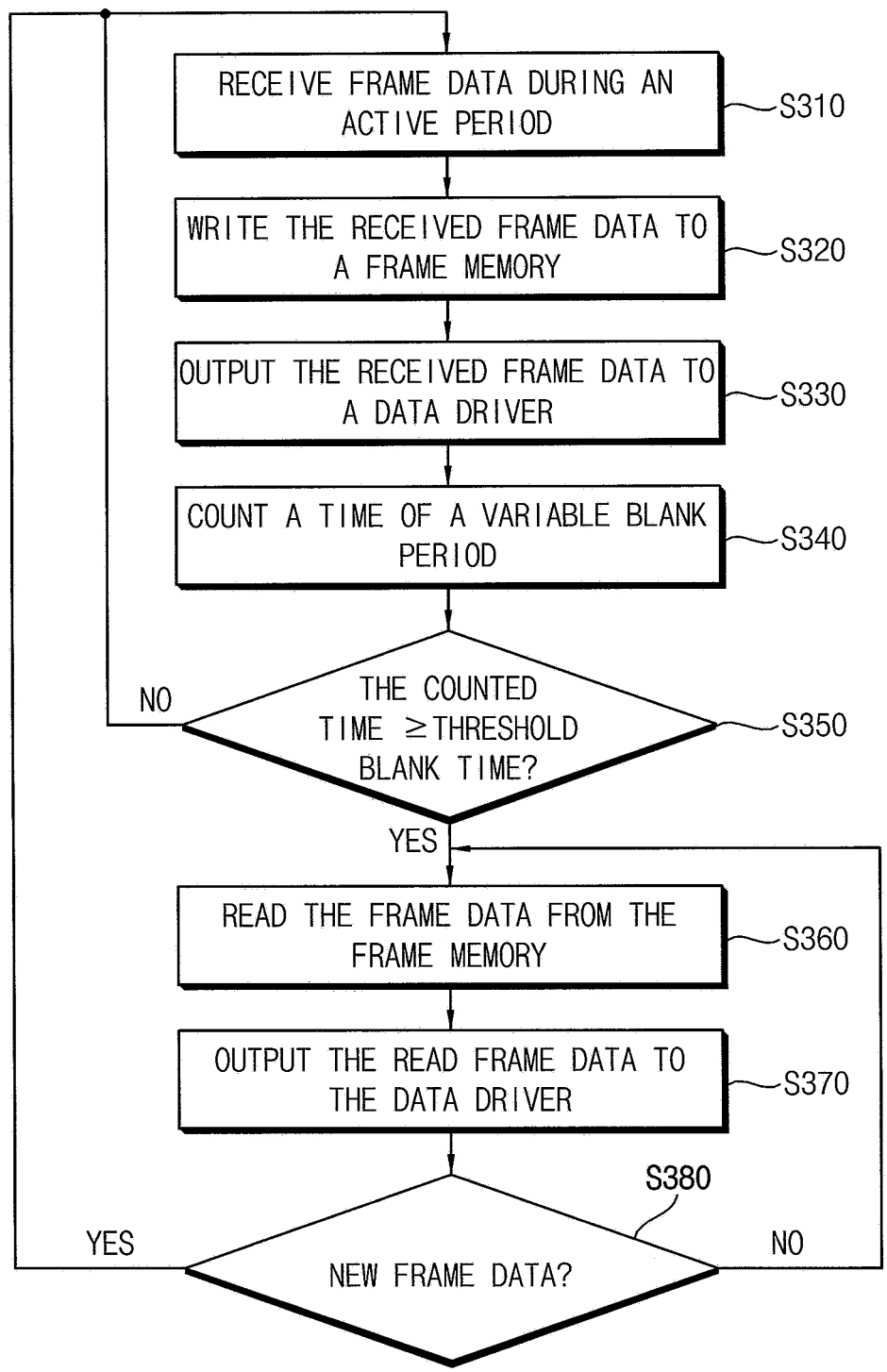
FIG. 3 is a flowchart illustrating a method of operating a display device supporting a variable frame mode according to example embodiments.
Figure 4:
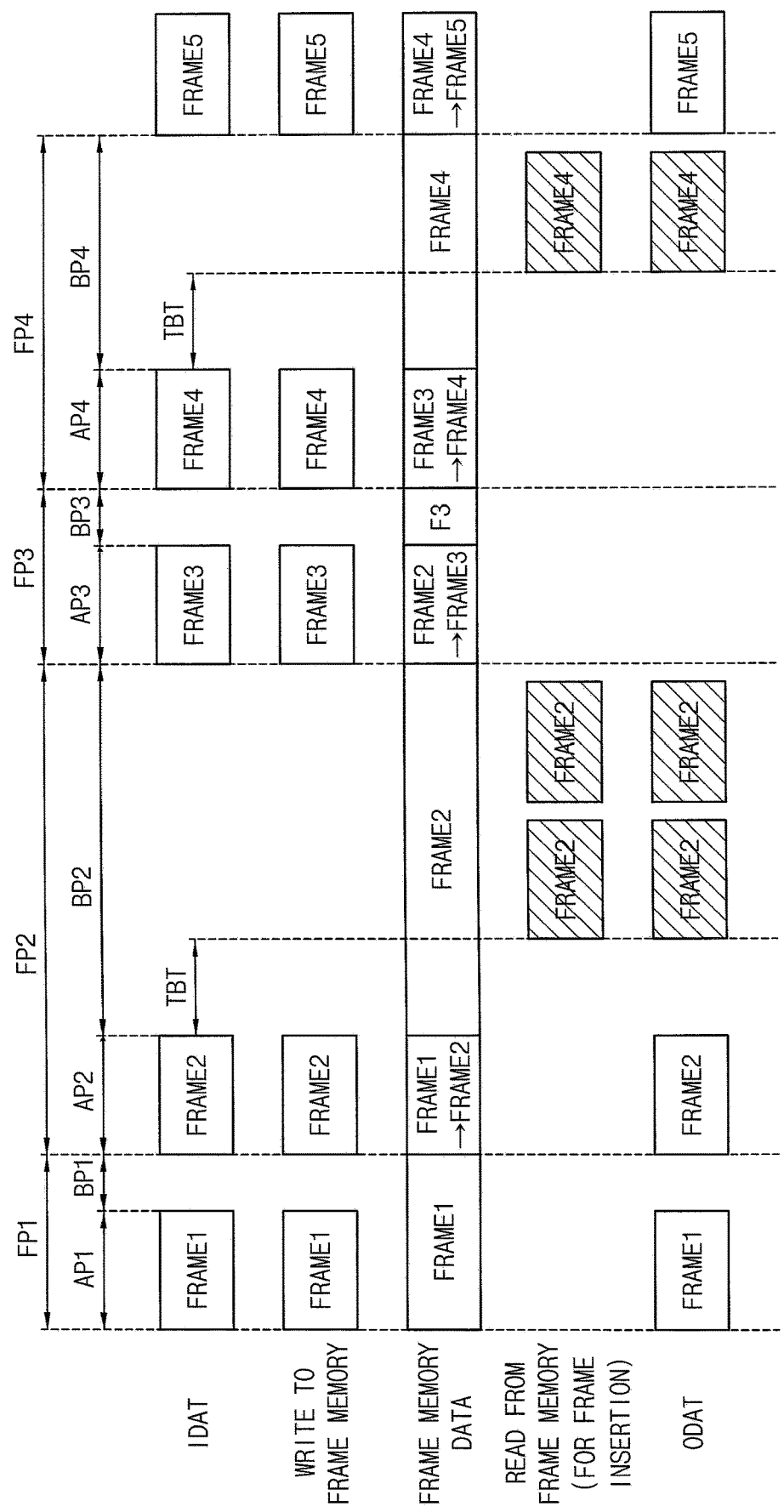
FIG. 4 is a timing diagram for describing an example of a method of operating a display device supporting a variable frame mode illustrated in FIG. 3.

FIG. 3 is a flowchart illustrating a method of operating a display device supporting a variable frame mode according to example embodiments, and FIG. 4 is a timing diagram for describing an example of a method of operating a display device supporting a variable frame mode illustrated in FIG. 3.

Referring to FIGS. 1, 3 and 4, in a method of operating a display device 100 supporting a variable frame mode, a timing controller 140 may receive frame data IDAT during a constant active period AP1, AP2, AP3, AP4 of a frame period FP1, FP2, FP3, FP4 including the active period AP1, AP2, AP3, AP4 and a variable blank period BP1, BP2, BP3, BP4 (S310).

In the active period AP1, AP2, AP3, AP4, the timing controller 140 may write the received frame data IDAT to a frame memory 160 (S320), and may output, as output frame data ODAT, the received frame data IDAT to a data driver 130 to display an image based on the received frame data IDAT (S330). For example, in a first active period AP1 of a first frame period FP1, the timing controller 140 may receive first frame data FRAME1, may write the first frame data FRAME1 to the frame memory 160, and may output the first frame data FRAME1 to the data driver 130. The data driver 130 may provide a display panel 110 with data signals corresponding to the first frame data FRAME1, and the display panel 110 may display (or refresh) an image in response to the data signals.

After the active period AP1, AP2, AP3, AP4 ends, a blank time counter 170 may count a time of the variable blank period BP1, BP2, BP3, BP4 (S340), and, if new frame data are received before the time of the variable blank period BP1, BP2, BP3, BP4 reaches a set or predetermined threshold blank time TBT (S350: NO), the timing controller 140 may perform again the receiving (S310) of the new frame data, the writing (S320) to the frame memory 160 and the outputting (S330) to the data driver 130. For example, if second frame data FRAME2 are inputted before a time of a first variable blank period BP1 reaches the threshold blank time TBT, the timing controller 140 may receive the second frame data FRAME2, may write the second frame data FRAME2 to the frame memory 160, and may output the second frame data FRAME2 to the data driver 130 to display an image based on the second frame data FRAME2. In some example embodiments, the blank time counter 170 may count the time of the variable blank period BP1, BP2, BP3, BP4 by using (but is not limited to counting the time of the variable blank period BP1, BP2, BP3, BP4 by using), an internal oscillator included in the timing controller 140. In some example embodiments, the threshold blank time TBT may be settable by a host processor.

When the time of the variable blank period BP1, BP2, BP3, BP4 reaches the threshold blank time TBT (S350: YES), the timing controller 140 may read the frame data stored in the frame memory 160 (S360), and may output the read frame data ODAT to the data driver 130 to display an image corresponding to the read frame data ODAT (S370). For example, when a time of a second variable blank period BP2 reaches the threshold blank time TBT, the timing controller 140 may read the second frame data FRAME2 from the frame memory 160, and may output the second frame data FRAME2 to the data driver 130 to display an image corresponding to the second frame data FRAME2. Accordingly, although the frame data IDAT are not inputted during the second variable blank period BP2, the display device 100 may display (or refresh) an image, thereby reducing or preventing image quality deterioration caused by a leakage current, etc.

If new frame data are not inputted (S380: NO), the timing controller 140 may perform again the reading (S360) from the frame memory 160 and the outputting (S370) to the data driver 130. For example, the timing controller 140 may perform again the reading and outputting of the second frame data FRAME2. In some example embodiments, during a period from when the time of the variable blank period BP1, BP2, BP3, BP4 reaches the threshold blank time TBT to when the new frame data are received, the timing controller 140 may output the frame data ODAT stored in the frame memory 160 with a constant frame rate. For example, until third frame data FRAME3 are inputted, the timing controller 140 may output the second frame data FRAME2 stored in the frame memory 160 to the data driver 130 with the constant frame rate. In some example embodiments, in the variable frame mode, the frame data IDAT may be inputted from the host processor to the display device 100 with a frame rate that is changed within a set or predetermined frame rate range, and the constant frame rate (or a frame rate of frame insertion) at which the frame data ODAT stored in the frame memory 160 are outputted is the maximum frame rate within the frame rate range. For example, the frame data IDAT may be inputted with the variable frame rate ranging from about 25 Hz to about 144 Hz in the variable frame mode, and the frame rate of the frame insertion may be about 144 Hz. In an example of FIG. 4, during the second variable blank period BP2, the second frame data FRAME2 stored in the frame memory 160 may be outputted to the data driver 130 with about 144 Hz.

If new frame data are inputted (S380: YES), the timing controller 140 may perform again the receiving (S310) of the new frame data, the writing (S320) to the frame memory 160 and the outputting (S330) to the data driver 130. For example, if the third frame data FRAME3 are inputted, the timing controller 140 may receive the third frame data FRAME3, may write the third frame data FRAME3 (or F3) to the frame memory 160, and may output the third frame data FRAME3 to the data driver 130 to display an image corresponding to the third frame data FRAME3. Further, the third frame data FRAME3 and subsequent fourth and fifth frame data FRAME4 and FRAME5 may be received with the variable frame rate; and, when the time of each variable blank period BP3 and BP4 reaches the threshold blank time TBT, outputting the frame data FRAME4 stored in the frame memory 160, or the frame insertion, may be performed.

Figure 5:
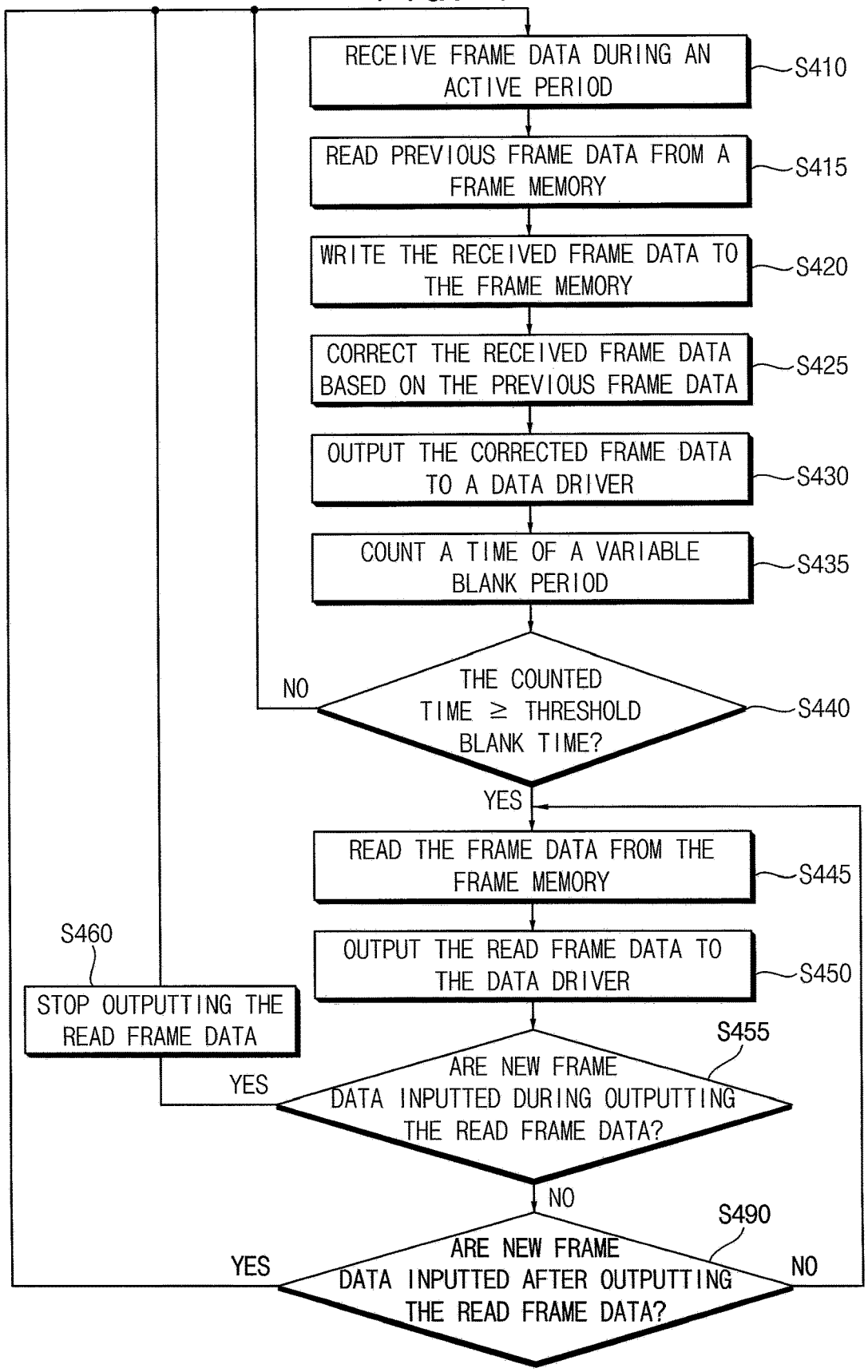
FIG. 5 is a flowchart illustrating a method of operating a display device supporting a variable frame mode according to example embodiments.
Figure 6:
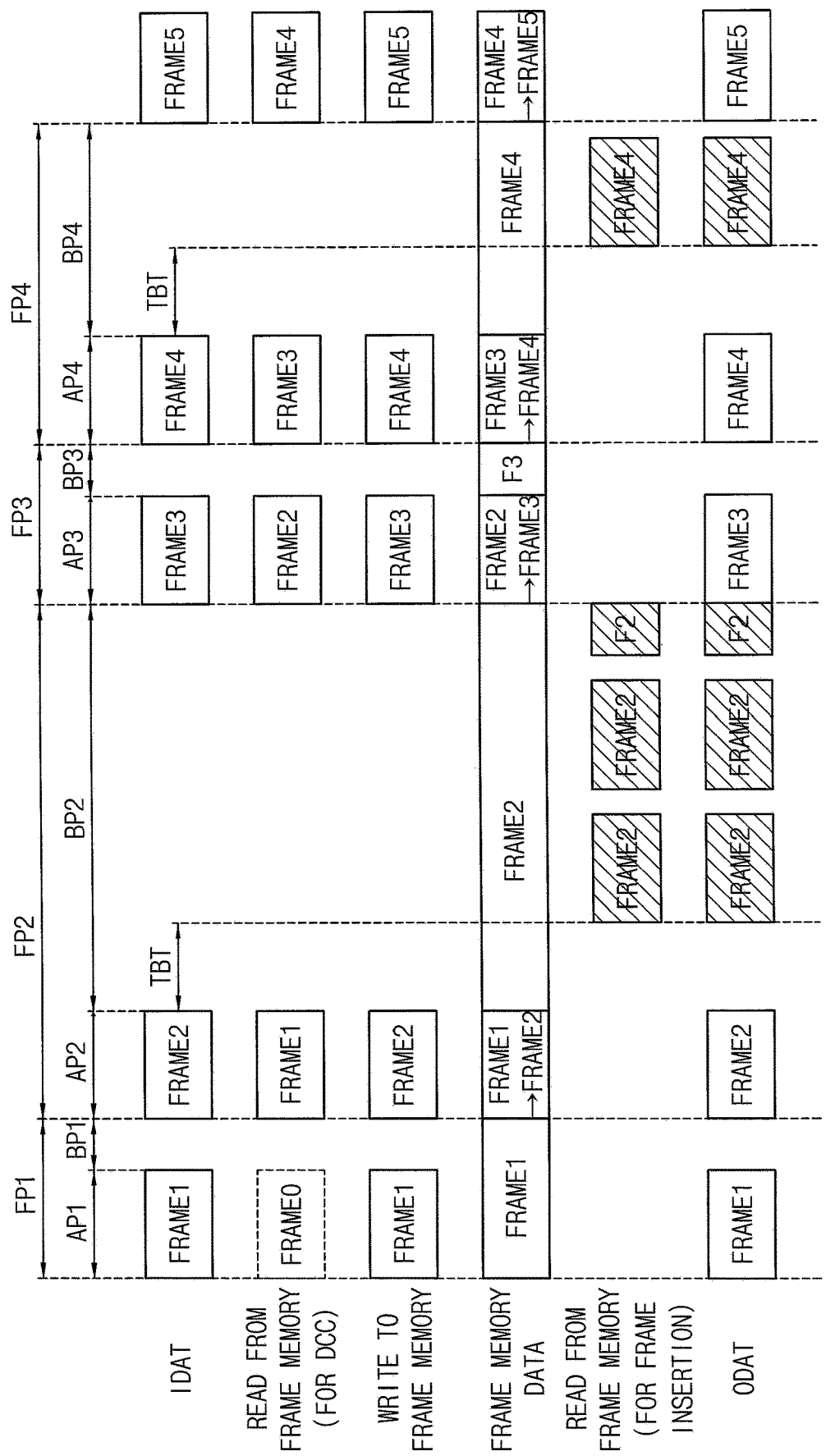
FIG. 6 is a timing diagram for describing an example of a method of operating a display device supporting a variable frame mode illustrated in FIG. 5.

FIG. 5 is a flowchart illustrating a method of operating a display device supporting a variable frame mode according to example embodiments, and FIG. 6 is a timing diagram for describing an example of a method of operating a display device supporting a variable frame mode illustrated in FIG. 5.

Referring to FIGS. 1, 5 and 6, in a method of operating a display device 100 supporting a variable frame mode, a timing controller 140 may receive frame data IDAT during a constant active period AP1, AP2, AP3, AP4 of a frame period FP1, FP2, FP3, FP4 including the active period AP1, AP2, AP3, AP4 and a variable blank period BP1, BP2, BP3, BP4 (S410).

In the active period AP1, AP2, AP3, AP4, the timing controller 140 may read previous frame data from a frame memory 160 (S415), may write the received frame data IDAT to the frame memory 160 (S420), may perform a correction for the received frame data IDAT based on the previous frame data (S425), and may output corrected frame data ODAT to a data driver 130 (S430). For example, in a first active period AP1, the timing controller 140 may receive first frame data FRAME1, may read previous frame data FRAME0 from the frame memory 160, may write the first frame data FRAME1 to the frame memory 160, may perform the correction for the first frame data FRAME1 based on the previous frame data FRAME0, and may output the corrected first frame data FRAME1 to the data driver 130. In some example embodiments, a data processing unit 150 of the timing controller 140 may perform, as the correction, a dynamic capacitance compensation (DCC) for the frame data IDAT of a current frame based on differences between the frame data IDAT of the current frame and the previous frame data. Further, in some example embodiments, in this case, a start time point of reading (S415) the previous frame data may precede a start time point of writing (S420) the received frame data IDAT, and thus data corruption between the reading (S415) and the writing (S420) may not occur even if the frame memory 160 has a size corresponding to the frame data IDAT of one frame.

After the active period AP1, AP2, AP3, AP4 ends, a blank time counter 170 may count a time of the variable blank period BP1, BP2, BP3, BP4 (S435), and, if new frame data are received before the time of the variable blank period BP1, BP2, BP3, BP4 reaches a set or predetermined threshold blank time TBT (S440: NO), the timing controller 140 may perform again the receiving (S410) of the new frame data, the reading (S415) from the frame memory 160, the writing (S420) to the frame memory 160, the correction (S425) and the outputting (S430) to the data driver 130.

When the time of the variable blank period BP1, BP2, BP3, BP4 reaches the threshold blank time TBT (S440: YES), the timing controller 140 may read the frame data stored in the frame memory 160 (S445), and may output the read frame data ODAT to the data driver 130 to display an image corresponding to the read frame data ODAT (S450). If new frame data are not inputted (S455: NO and S490: NO), the timing controller 140 may perform again the reading (S445) from the frame memory 160 and the outputting (S450) to the data driver 130.

If new frame data are inputted while the frame data ODAT read from the frame memory 160 are outputted to the data driver 130 (S455: YES), the timing controller 140 may stop outputting the read frame data ODAT (S460). Further, the timing controller 140 may control a gate driver 120 to stop sequentially outputting gate signals by providing a reset signal to the gate driver 120. Then, the timing controller 140 may perform again the receiving (S410) the new frame data, the reading (S415) from the frame memory 160, the writing (S420) to the frame memory 160, the correction (S425) and the outputting (S430) to the data driver 130. For example, as illustrated in FIG. 6, in a second variable blank period BP2 after the threshold blank time TBT, the timing controller 140 may output second frame data FRAME2 stored in the frame memory 160 to the data driver 130 with a constant frame rate. Further, if third frame data FRAME3 are received during the outputting of the second frame data FRAME2, the timing controller 140 may stop outputting the second frame data FRAME2, may reset the gate driver 120 and/or the data driver 130, and may perform again the receiving (S410) of the third frame data FRAME3, the reading (S415) of the second frame data FRAME2 from the frame memory 160, the writing (S420) of the third frame data FRAME3 to the frame memory 160, the correction (S425) for the third frame data FRAME3 based on the second frame data FRAME2 and the outputting (S430) of the corrected third frame data FRAME3 to the data driver 130.

If new frame data are inputted after outputting the frame data ODAT read from the frame memory 160 to the data driver 130 (S490: YES), the timing controller 140 may perform again the receiving (S410) of the new frame data, the reading (S415) from the frame memory 160, the writing (S420) to the frame memory 160, the correction (S425) and the outputting (S430) to the data driver 130.

Figure 7:
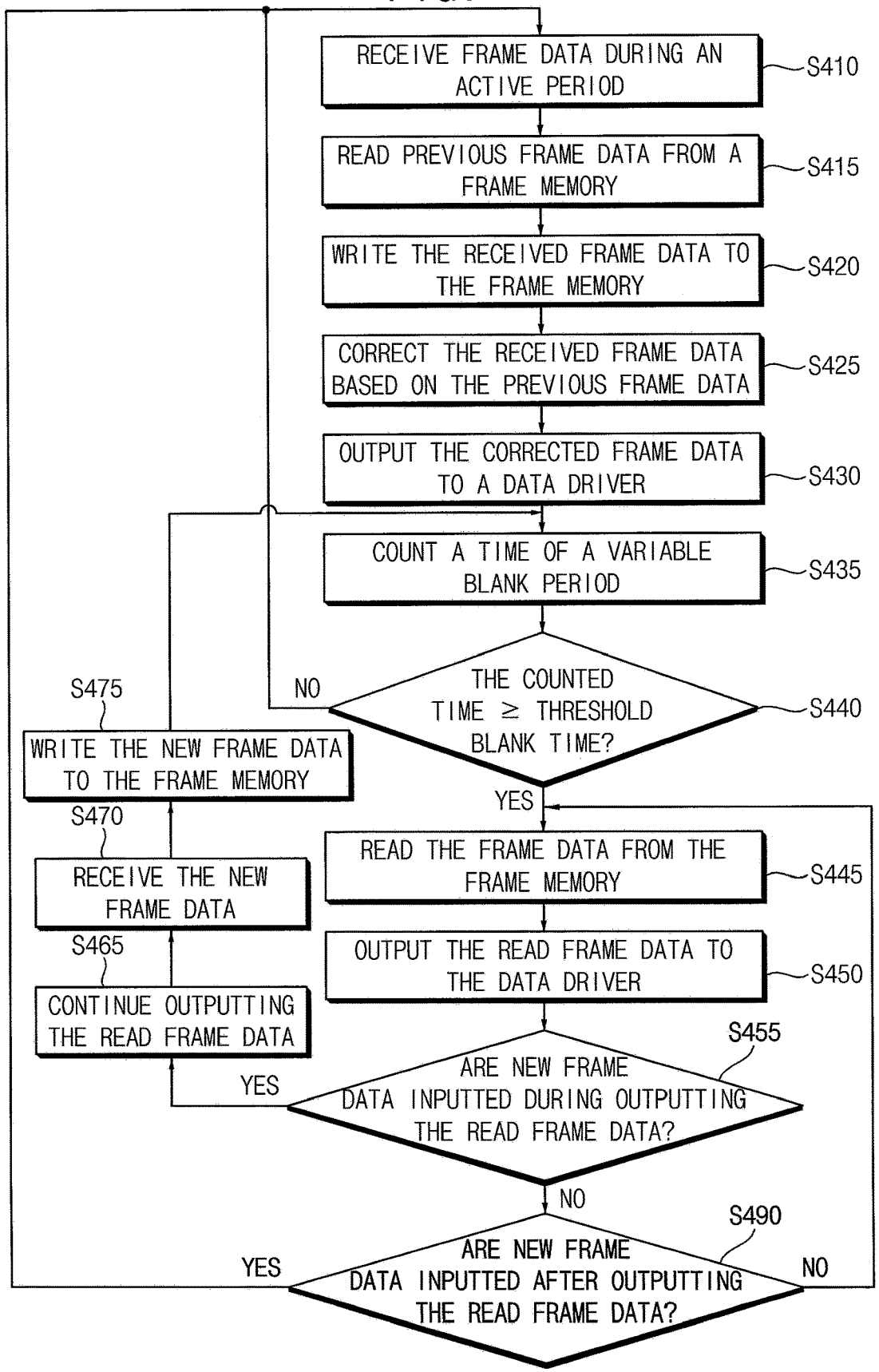
FIG. 7 is a flowchart illustrating a method of operating a display device supporting a variable frame mode according to example embodiments.
Figure 8:
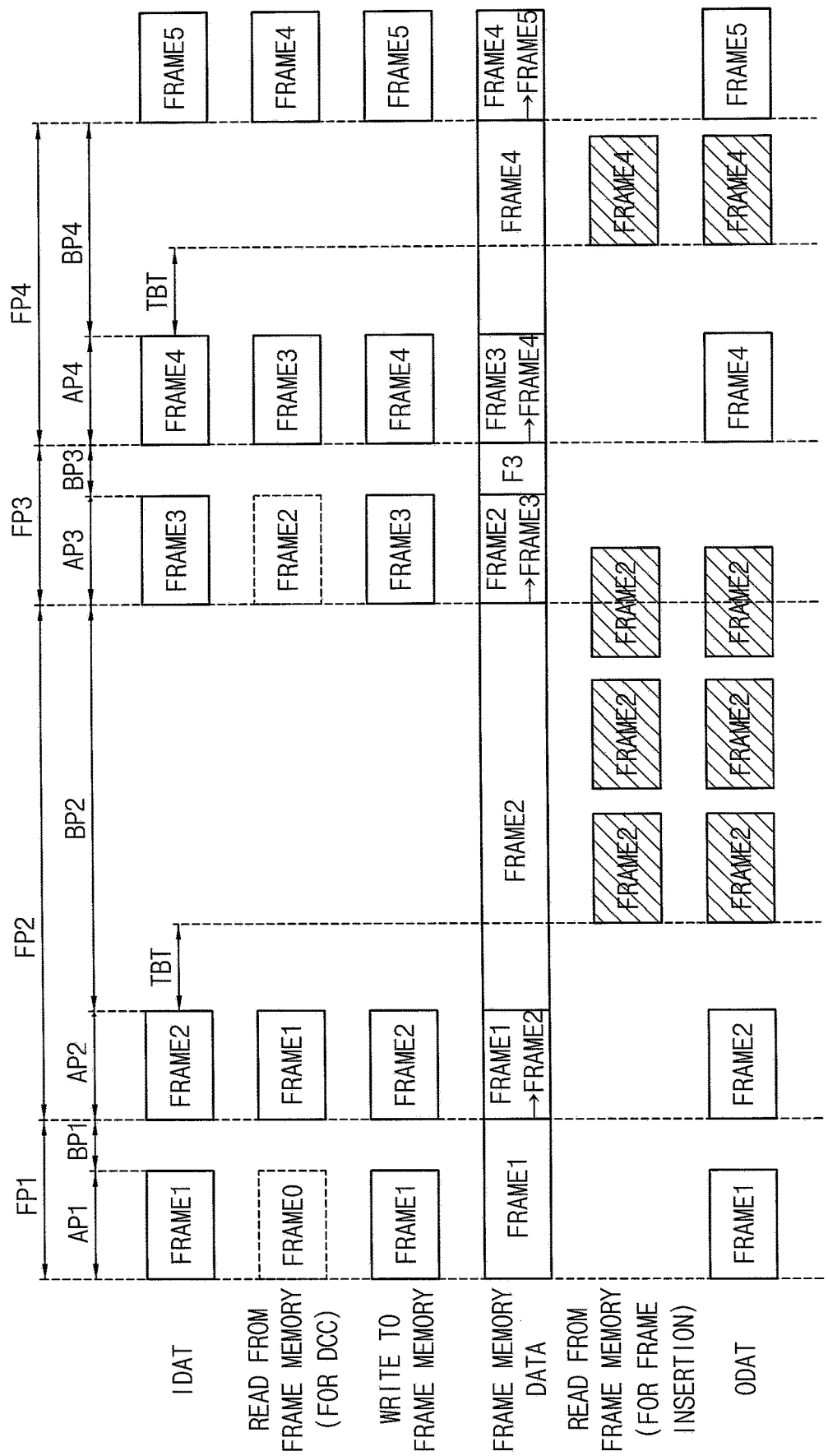
FIG. 8 is a timing diagram for describing an example of a method of operating a display device supporting a variable frame mode illustrated in FIG. 7.

FIG. 7 is a flowchart illustrating a method of operating a display device supporting a variable frame mode according to example embodiments, and FIG. 8 is a timing diagram for describing an example of a method of operating a display device supporting a variable frame mode illustrated in FIG. 7.

A method illustrated in FIGS. 7 and 8 may be similar to a method illustrated in FIGS. 5 and 6, except that, even if new frame data are inputted while read frame data are outputted (S455: YES), outputting the read frame data continues (S465).

Referring to FIGS. 1, 7 and 8, even if new frame data are inputted while frame data ODAT read from a frame memory 160 are outputted (S455: YES), a timing controller 140 may continue outputting the frame data ODAT read from the frame memory 160 (S460). Further, the timing controller 140 may receive the new frame data IDAT (S470), and may write the new frame data IDAT to the frame memory 160 (S475). For example, as illustrated in FIG. 8, in a second variable blank period BP2 after a threshold blank time TBT, the timing controller 140 may output second frame data FRAME2 stored in the frame memory 160 to a data driver 130 with a constant frame rate. Further, if third frame data FRAME3 are inputted during the outputting of the second frame data FRAME2, the timing controller 140 may continue outputting the second frame data FRAME2 until the entire second frame data FRAME2 are outputted. Further, the timing controller 140 may receive the third frame data FRAME3 and may write the third frame data FRAME3 to the frame memory 160.

After receiving the new frame data (e.g., FRAME3), if a time of a variable blank period (e.g., BP3) reaches the threshold blank time TBT (S440: YES), the timing controller 140 may output frame data (e.g., FRAME3) stored in the frame memory 160 to the data driver 130 (S445 and S450). Alternatively, as illustrated in FIG. 8, after receiving the new frame data (e.g., FRAME3), if fourth frame data FRAME4 are inputted before the time of the third variable blank period BP3 reaches the threshold blank time TBT (S440: NO), the timing controller 140 may perform again the receiving (S410) of the fourth frame data FRAME4, the reading (S415) of the third frame data FRAME3 from the frame memory 160, the writing (S420) of the fourth frame data FRAME4 to the frame memory 160, a correction (S425) for the fourth frame data FRAME4 based on the third frame data FRAME3 and the outputting (S430) of the corrected fourth frame data FRAME4 to the data driver 130.

Figure 9:
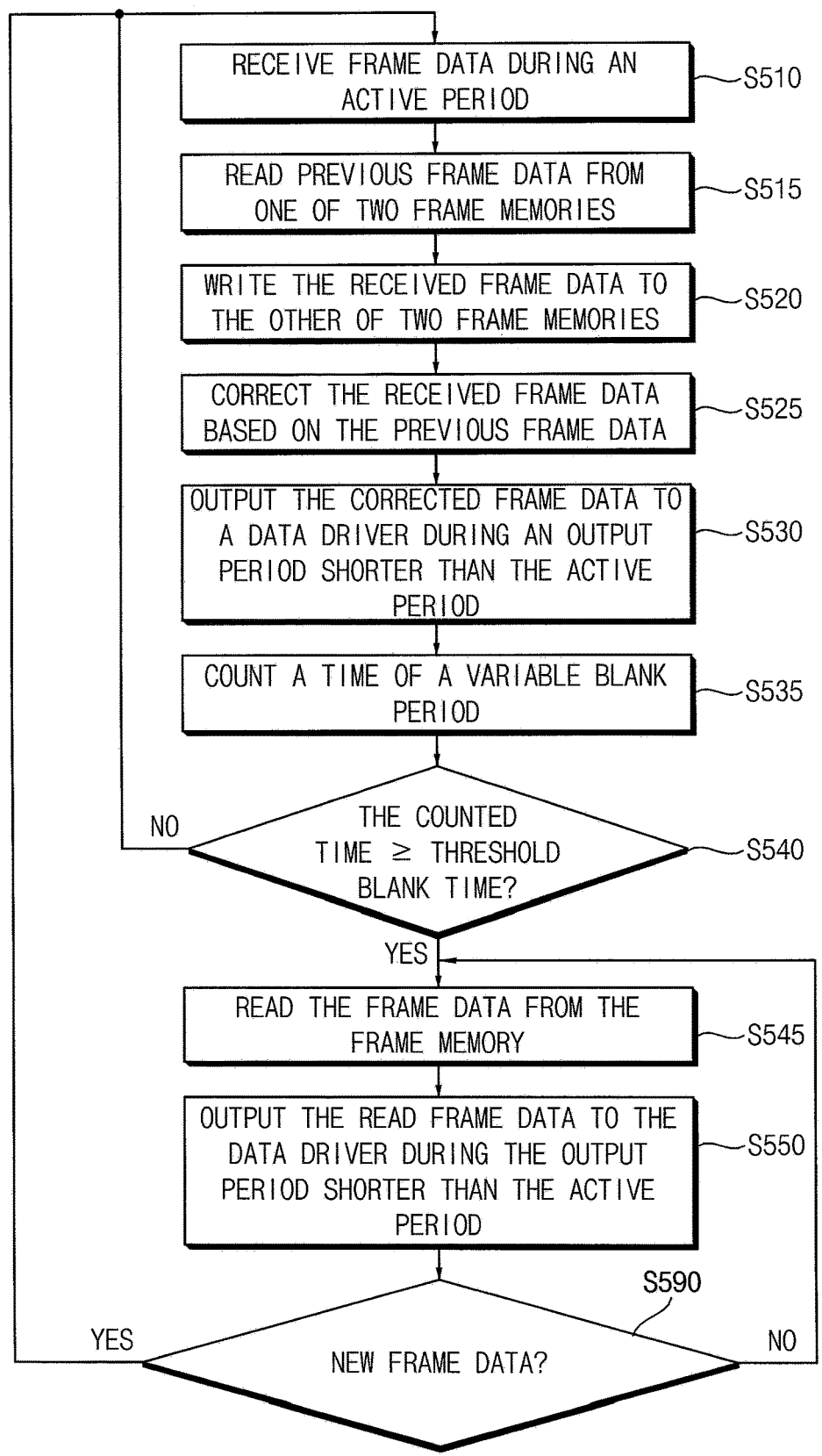
FIG. 9 is a flowchart illustrating a method of operating a display device supporting a variable frame mode according to example embodiments.
Figure 10:
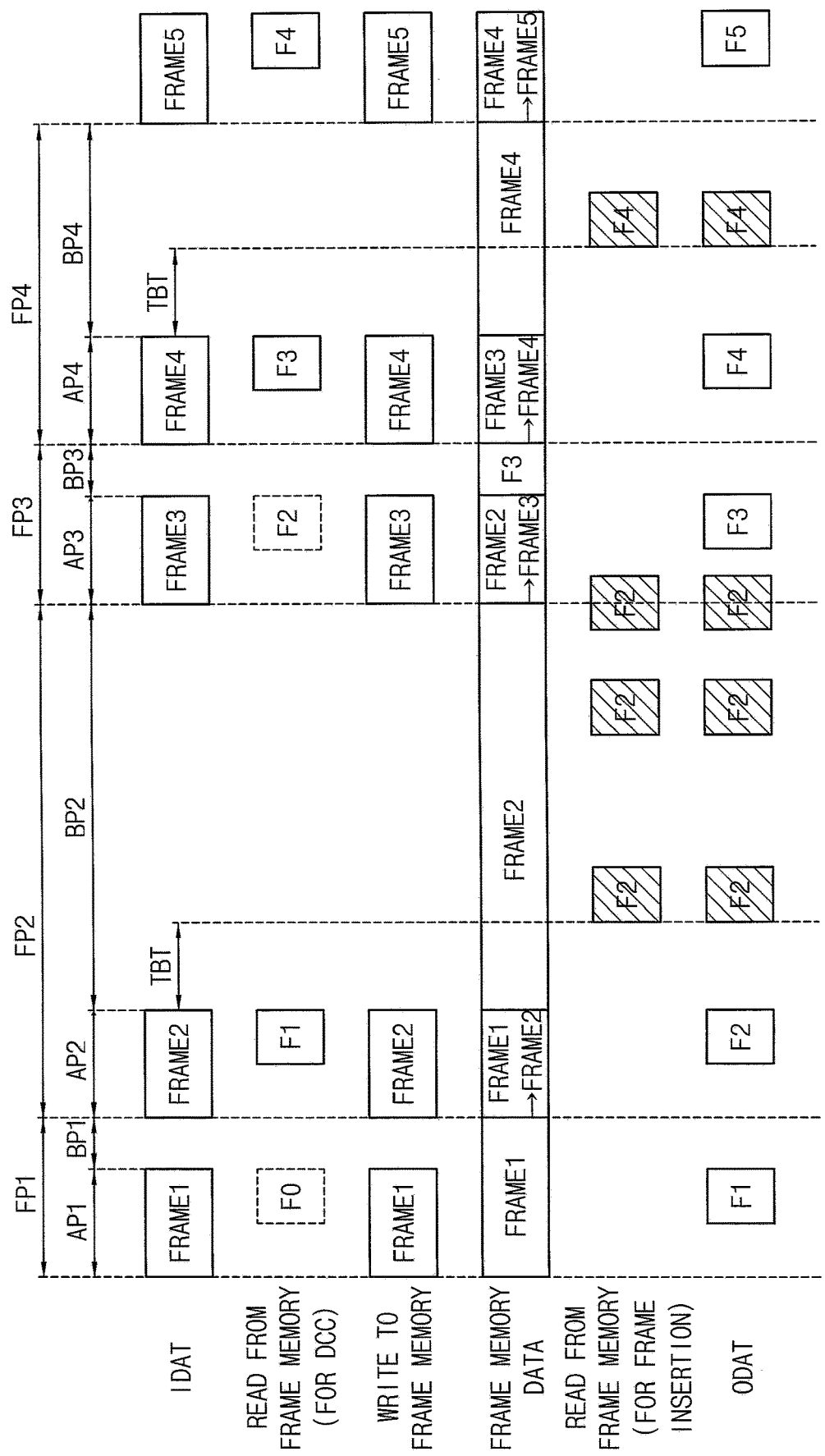
FIG. 10 is a timing diagram for describing an example of a method of operating a display device supporting a variable frame mode illustrated in FIG. 9.

FIG. 9 is a flowchart illustrating a method of operating a display device supporting a variable frame mode according to example embodiments, and FIG. 10 is a timing diagram for describing an example of a method of operating a display device supporting a variable frame mode illustrated in FIG. 9.

Referring to FIGS. 1, 9 and 10, in a method of operating a display device 100 illustrated in FIGS. 9 and 10, an output period in which frame data ODAT are outputted from a timing controller 140 to a data driver 130 may be shorter than an active period AP1, AP2, AP3, AP4 in which frame data IDAT are inputted from a host processor to the timing controller 140. In some example embodiments, the output period may be shorter than or equal to a half of the active period AP1, AP2, AP3, AP4. For example, the timing controller 140 may output the frame data ODAT to the data driver 130 in synchronization with a pixel clock frequency that is (more than) two times a pixel clock frequency received from a host processor. In some example embodiments, to decrease the output period to be shorter than or equal to the half of the active period AP1, AP2, AP3, AP4, the timing controller 140 may include the frame memory 160 having a size corresponding to the frame data IDAT of two frames, or two frame memories 160 each having a size corresponding to the frame data IDAT of one frame.

In the method illustrated in FIGS. 9 and 10, the timing controller 140 may receive the frame data IDAT during the active period AP1, AP2, AP3, AP4 (S510). In the active period AP1, AP2, AP3, AP4, the timing controller 140 may write the received frame data IDAT to one of the two frame memories 160 (S520). During a portion of the active period AP1, AP2, AP3, AP4, or during the output period shorter than the active period AP1, AP2, AP3, AP4, the timing controller 140 may read previous frame data from the frame memory 160 (S515), may perform a correction for the received frame data IDAT based on the previous frame data (S525), and may output the corrected frame data ODAT to the data driver (S530). For example, in a first active period AP1, the timing controller 140 may receive first frame data FRAME1 (or F1) and may write the first frame data FRAME1 to the frame memory 160. Further, during a portion of the first active period AP1, or during the output period shorter than the first active period AP1, the timing controller may read previous frame data F0 from the frame memory 160, may perform the correction for the first frame data F1, and may output the corrected first frame data F1 to the data driver 130.

After the active period AP1, AP2, AP3, AP4 ends, a blank time counter 170 may count a time of a variable blank period BP1, BP2, BP3, BP4 (S535), and, when a time of the variable blank period BP1, BP2, BP3, BP4 reaches a set or predetermined threshold blank time TBT (S540: YES), the timing controller 140, during the output period shorter than the active period AP1, AP2, AP3, AP4, may read the frame data ODAT stored in the frame memory 160 (S545), and may output the read frame data ODAT to the data driver 130 to display an image corresponding to the read frame data ODAT (S550).

In the method illustrated in FIGS. 9 and 10, since the frame data ODAT are outputted from the timing controller 140 to the data driver 130 during the output period shorter than or equal to the half of the active period AP1, AP2, AP3, AP4, even if new frame data are inputted while the frame data ODAT read from the frame memory 160 are outputted (S590: YES), the outputting of the frame data ODAT read from the frame memory 160 and the outputting of the new frame data may not overlap each other. For example, as illustrated in FIG. 10, in a second variable blank period BP2 after the threshold blank time TBT, if third frame data FRAME3 are inputted while second frame data F2 stored in the frame memory 160 are outputted, the third frame data F3 may be outputted after the outputting of the second frame data F2 is completed, and the outputting of the second frame data F2 and the outputting of the third frame data F3 may not overlap.

Figure 11:
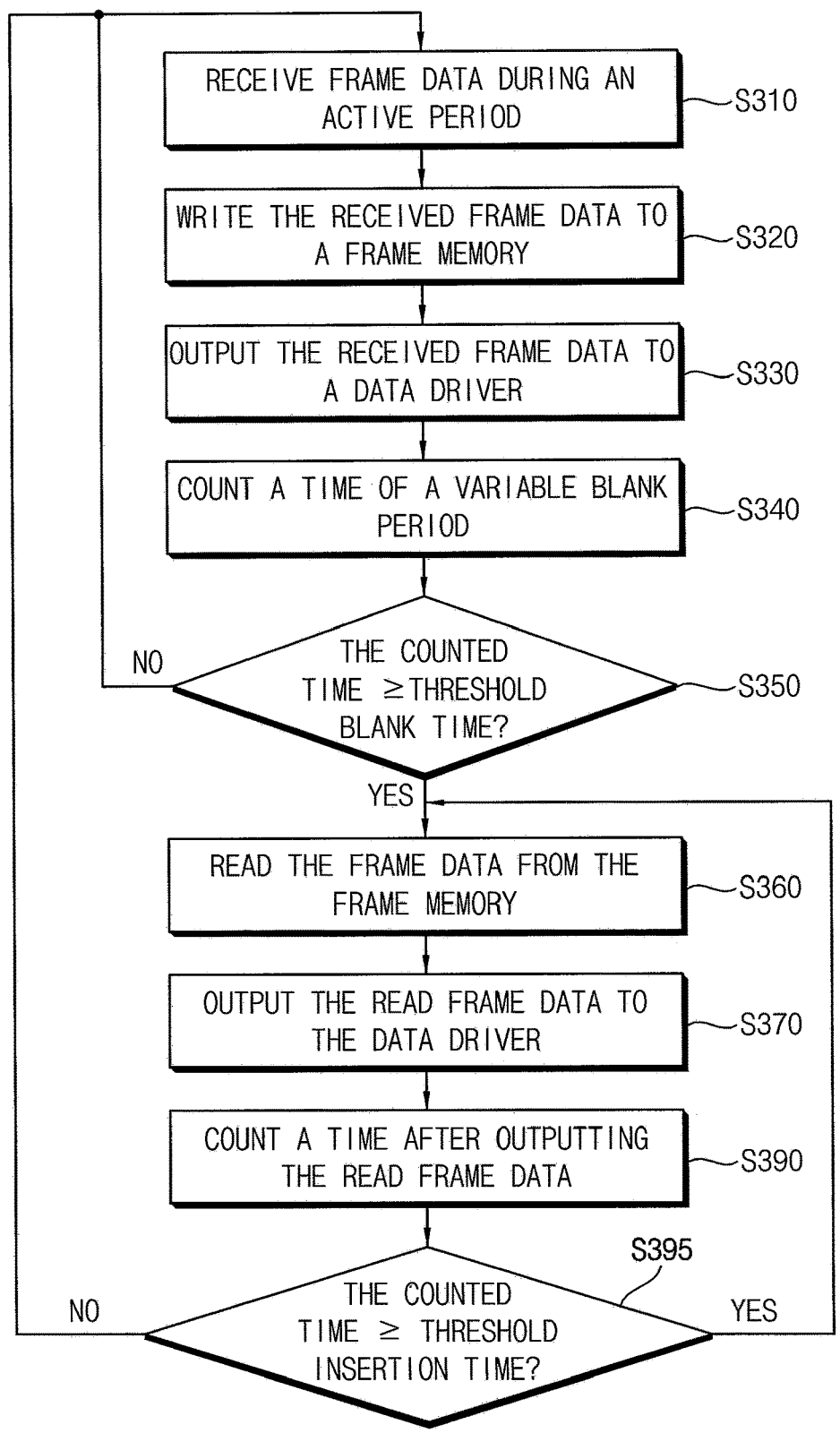
FIG. 11 is a flowchart illustrating a method of operating a display device supporting a variable frame mode according to example embodiments.
Figure 12:
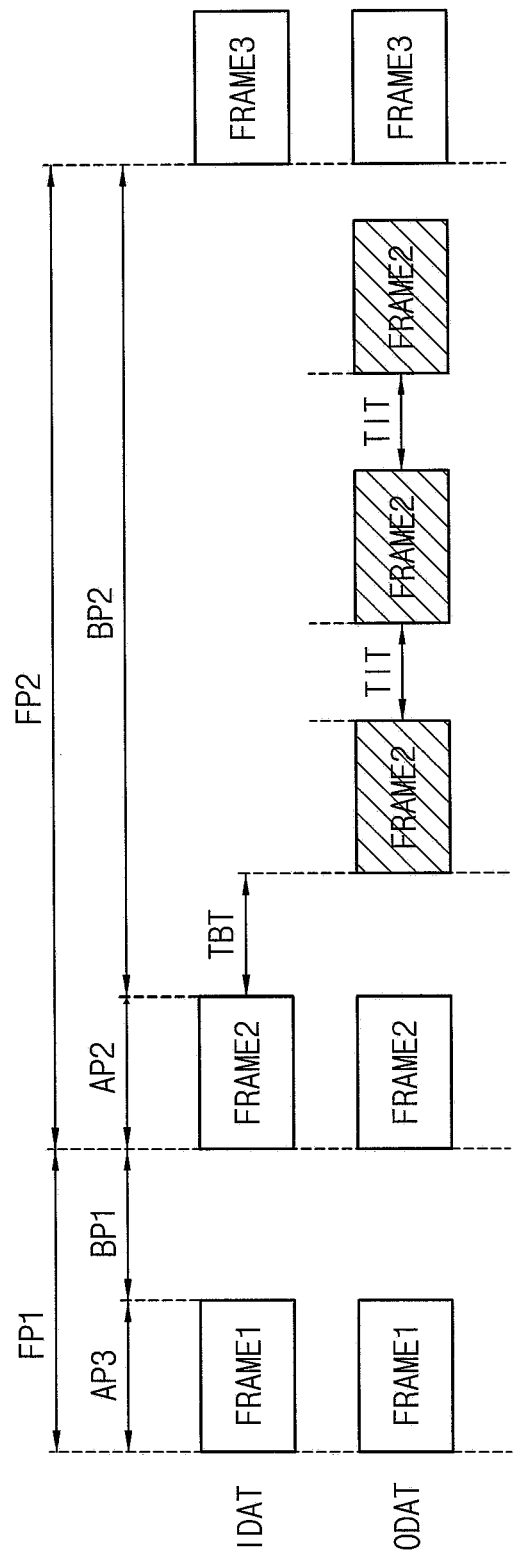
FIG. 12 is a timing diagram for describing an example of a method of operating a display device supporting a variable frame mode illustrated in FIG. 11.

FIG. 11 is a flowchart illustrating a method of operating a display device supporting a variable frame mode according to example embodiments, and FIG. 12 is a timing diagram for describing an example of a method of operating a display device supporting a variable frame mode illustrated in FIG. 11.

A method illustrated in FIGS. 11 and 12 may be similar to a method illustrated in FIGS. 3 and 4, except that a time from when outputting frame data ODAT stored in a frame memory 160 is completed may be counted (S390), and, when the counted time reaches a set or predetermined threshold insertion time TIT (S395: YES), the frame data ODAT stored in the frame memory 160 may be outputted again to a data driver 130 (S360 and S370).

For example, as illustrated in FIG. 12, when a time of a second variable blank period BP2 reaches a threshold blank time TBT, a timing controller 140 may read second frame data FRAME2 from the frame memory 160, and may output the second frame data FRAME2 to the data driver 130 to display an image corresponding to the second frame data FRAME2. When a time from, when outputting the second frame data FRAME2 read from the frame memory 160 is completed, reaches the threshold insertion time TIT, the second frame data FRAME2 read from the frame memory 160 may be outputted again. In some example embodiments, the threshold insertion time TIT may be settable by (but is not limited to being settable by) a host processor. In this case, a frame rate of frame insertion may be adjusted by adjusting the threshold insertion time TIT.

One or more embodiments of the inventive concept may be applied to any suitable display device supporting the variable frame mode, and any electronic device including the display device. For example, one or more embodiments of the inventive concept may be applied to a television (TV), a digital TV, a 3D TV, a smartphone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, etc.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the inventive concept refers to "one or more embodiments of the inventive concept." Also, the term "exemplary" is intended to refer to an example or illustration.

As used herein, the terms "use," "using," and "used" may be considered synonymous with the terms "utilize," "utilizing," and "utilized," respectively.

The display device and/or any other relevant devices or components according to embodiments of the present invention described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or may be formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media, such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

The foregoing is illustrative of example embodiments of the inventive concept and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as being limited to the specific example embodiments disclosed, and that modifications to the disclosed example embodiments, as well as other example embodiments, are intended to be included within the scope of the appended claims, and equivalents thereof.

What is claimed is:

1. A method of operating a display device supporting a variable frame mode, the method comprising:
   receiving frame data during a constant active period of a frame period, the frame period including the active period and a variable blank period;
   writing the received frame data to a frame memory in the active period;
   outputting the received frame data to a data driver in the active period to display an image based on the received frame data;
   counting a time of the variable blank period;
   determining if the time of the variable blank period is equal to or greater than a set threshold blank time;
   based on determining that the time of the variable blank period is equal to or greater than the set threshold blank time, outputting the frame data stored in the frame memory to the data driver in the variable blank period to display an image based on the frame data stored in the frame memory;
   counting a time from when outputting, in the variable blank period, the frame data stored in the frame memory is completed;
   based on determining that, the counted time from when outputting, in the variable blank period, the frame data stored in the frame memory is completed is greater than or equal to a set threshold insertion time, outputting again, in the variable blank period, the frame data stored in the frame memory to the data driver; and
   based on determining that new frame data are received while the frame data stored in the frame memory are outputted again in the variable blank period and based on determining that an output period in which the frame data stored in the frame memory are outputted is shorter than or equal to a half of the active period in which the frame data are received, continue outputting the frame data stored in the frame memory,
   wherein the frame memory has a size corresponding to the frame data.

2. The method of claim 1, wherein the frame data written to the frame memory in a current frame are used in a dynamic capacitance compensation (DCC) operation for frame data to be received in a next frame.

3. The method of claim 1, wherein the time of the variable blank period is counted using an internal oscillator included in a timing controller of the display device.

4. The method of claim 1, wherein the set threshold blank time is settable by a host processor.

5. The method of claim 1, wherein the frame data stored in the frame memory are outputted with a constant frame rate from when the time of the variable blank period reaches the set threshold blank time to when new frame data are received.

6. The method of claim 5, wherein, in the variable frame mode, the frame data are inputted from a host processor to the display device with a frame rate that is changed within a set frame rate range, and wherein the constant frame rate at which the frame data stored in the frame memory are outputted is a maximum frame rate within the set frame rate range.

7. The method of claim 1, further comprising:
reading previous frame data written to the frame memory in a previous frame from the frame memory in the active period of a current frame; and
performing a correction for the frame data received in the current frame based on the previous frame data.

8. The method of claim 7, wherein the correction is a dynamic capacitance compensation (DCC) for the frame data of the current frame based on differences between the frame data of the current frame and the previous frame data.

9. The method of claim 1, wherein the new frame data are written to the frame memory, and the new frame data are outputted to the data driver to display an image based on the new frame data.

10. The method of claim 1, wherein, the new frame data are written to the frame memory.

11. The method of claim 1, wherein the frame memory has a size corresponding to the frame data of two frames.

12. The method of claim 1, wherein the threshold insertion time is settable by a host processor.

13. A display device comprising:
a display panel including a plurality of pixels;
a gate driver configured to provide gate signals to the plurality of pixels;
a data driver configured to provide data signals to the plurality of pixels;
a frame memory; and
a timing controller configured to support a variable frame mode, and to control the gate driver, the data driver, and the frame memory,
wherein the timing controller is configured to receive frame data during a constant active period of a frame period including the active period and a variable blank period,
wherein, in the active period, the timing controller is configured to write the received frame data to the frame memory, and output the received frame data to the data driver to display an image based on the received frame data,
wherein the timing controller is further configured to determine if a time of the variable blank period is equal to or greater than a set threshold blank time, and based on determining that the time of the variable blank period is equal to or greater than the set threshold blank time, the timing controller is configured to output the frame data stored in the frame memory to the data driver in the variable blank period to display an image based on the frame data stored in the frame memory,
wherein the timing controller is further configured to:
count a time from when outputting, in the variable blank period, the frame data stored in the frame memory is completed, and to output again, in the variable blank period, the frame data stored in the frame memory to the data driver, based on determining that, the counted time from when outputting, in the variable blank period, the frame data stored in the frame memory is completed is greater than or equal to a set threshold insertion time, and
continue outputting the frame data stored in the frame memory, based on determining that new frame data are received while the frame data stored in the frame memory are outputted again in the variable blank period and based on determining that an output period in which the frame data stored in the frame memory are outputted is shorter than or equal to a half of the active period in which the frame data are received,
wherein the frame memory has a size corresponding to the frame data.

14. The display device of claim 13, wherein the timing controller includes:
a blank time counter configured to count the time of the variable blank period.

15. The display device of claim 14, wherein the timing controller further includes:
a data processing unit configured to read previous frame data written to the frame memory in a previous frame from the frame memory in the active period of a current frame, and to perform a correction for the frame data received in the current frame based on the previous frame data.

16. The display device of claim 15, wherein the correction is a dynamic capacitance compensation (DCC) for the frame data of the current frame based on differences between the frame data of the current frame and the previous frame data.

* * * * *